US006613455B1

(12) United States Patent
Matsumoto et al.

(10) Patent No.: US 6,613,455 B1
(45) Date of Patent: Sep. 2, 2003

(54) ELECTROLUMINESCENT DEVICE AND METHOD FOR PRODUCING SAME

(75) Inventors: Kazumi Matsumoto, Sagamihara (JP); Mitsuaki Kobayashi, Tokyo (JP); Yoshinori Araki, Sagae (JP); Hidetoshi Abe, Tendo (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/868,121

(22) PCT Filed: Jan. 3, 2000

(86) PCT No.: PCT/US00/00024

§ 371 (c)(1), (2), (4) Date: Sep. 24, 2001

(87) PCT Pub. No.: WO00/42825

PCT Pub. Date: Jul. 20, 2000

(30) Foreign Application Priority Data

Jan. 14, 1999 (JP) .......................................... 11/007446

(51) Int. Cl.[7] .......................... C09G 3/10; H05B 33/14

(52) U.S. Cl. ....................... 428/690; 428/917; 313/502; 313/506; 313/509; 252/301.36

(58) Field of Search ................................ 428/690, 917; 427/66; 313/502, 506, 509; 252/301.36

(56) References Cited

U.S. PATENT DOCUMENTS

| | | | | |
|---|---|---|---|---|
| 4,143,297 A | | 3/1979 | Fischer | |
| 4,529,885 A | * | 7/1985 | Waite et al. | 250/484.1 |
| 4,902,567 A | * | 2/1990 | Eilertsen et al. | 428/328 |
| 5,019,748 A | | 5/1991 | Appelberg | |
| 5,045,755 A | | 9/1991 | Appelberg | |
| 5,069,815 A | * | 12/1991 | Aoki et al. | 252/301.36 |
| 5,552,668 A | * | 9/1996 | Hirose et al. | 313/506 |

FOREIGN PATENT DOCUMENTS

| | | |
|---|---|---|
| JP | 59-14878 | 12/1980 |
| JP | 62-59879 | 3/1987 |
| JP | 06203957 | 7/1994 |
| WO | WO 88/04467 | 6/1988 |
| WO | WO 98/53645 | 11/1998 |

* cited by examiner

*Primary Examiner*—Cynthia H. Kelly
*Assistant Examiner*—Dawn Garrett
(74) *Attorney, Agent, or Firm*—Carolyn A. Fischer

(57) ABSTRACT

The present invention provides an electroluminescent device comprising a transparent conductive layer, a binder layer placed on the back surface of the transparent conductive layer, a luminescent-particle layer comprising a substantially single layer of particles containing luminescent particles, which layer is applied on the back surface of the transparent conductive layer through the binder layer, an insulating layer comprising insulating particles, which is placed on the back surface of the luminescent-particle layer, and a rear electrode placed on the back surface of the insulating layer, in which the luminescent particles are embedded in the binder layer, or the luminescent particles are substantially not embedded in the insulating layer.

23 Claims, 1 Drawing Sheet

ELECTROLUMINESCENT DEVICE AND METHOD FOR PRODUCING SAME

FIELD

The present invention relates to an electroluminescent device (hereinafter referred to as "EL device") having a luminescent layer which comprises luminescent particles and a binder resin. In particular, the present invention relates to an EL device which can achieve a high luminescent efficiency.

BACKGROUND

EL devices having a so-called "dispersion type luminescent layer" which is formed by dispersing luminescent particles such as phosphor particles in binder resins such as polymers having a high dielectric constant are known from the following publications.

For example, JP-B-59-14878 discloses an EL device comprising a transparent substrate, a transparent electrode layer, an insulating layer consisting of a vinylidene fluoride binder resin, a luminescent layer comprising a vinylidene fluoride binder resin and phosphor particles, the same insulating layer as above, and a rear electrode, which are laminated in this order. JP-B-62-59879 discloses an EL device comprising a polyester film, an ITO electrode, a luminescent layer which comprises phosphor particles and a cyanoethylated ethylene-vinyl alcohol copolymer (a binder resin), and an aluminum foil (a rear electrode), which are laminated in this order.

Unfortunately, however, it is difficult to increase the luminance in the case of such "dispersion type luminescent layers". The reason for this is that luminescent particles, which have a larger specific gravity than binder resins, tend to sink in a coating for forming luminescent layers comprising luminescent particles dispersed in the solution of binder resins, and thus it is difficult to uniformly disperse the luminescent particles in the luminescent layers formed from such a coating. Furthermore, the dispersibility deteriorates when the amount of luminescent particles in the coating is increased to increase the filling rate of luminescent particles in the luminescent layer. The filling rate of the luminescent particles is at most 20 volume % of the coating weight. In addition, it is relatively difficult to increase the coating thickness of the luminescent layer while maintaining the uniformity of a thickness using such a dispersion type coating. Therefore; when the number of applications of the coating is increased to increase the thickness of the luminescent layer, the productivity decreases, and it is difficult to produce a roll-form EL device having a large area.

EL devices having a "lamination type luminescent layer" are known as one measure to solve the drawbacks of the "dispersion type luminescent layers". For example, U.S. Pat. Nos. 5,019,748 and 5,045,755 disclose an EL device having a lamination type luminescent layer, which consists of a three-layer laminate comprising: (1) a first dielectric adhesive layer with a high dielectric constant applied on the transparent conductive layer of a transparent substrate; (2) a phosphor particle layer in the form of a substantially single layer (having a thickness not exceeding the largest size of particles), which is formed by electrostatically applying dry phosphor particles (luminescent particles) on the first dielectric adhesive layer; and (3) a second dielectric layer placed on the phosphor particle layer and containing a dielectric material with a high dielectric constant, which layer fills the spaces between adjacent phosphor particles. A rear electrode is applied on the surface of the second dielectric layer, and thus the second dielectric layer functions as an insulating layer.

In contrast with the above "dispersion type luminescent layer", it is possible to continuously carry out the coating processes, and it is possible to produce a roll-form EL device by the disclosed method. However, the above publications and patent specifications do not disclose any specific manner to form a continuous terminal (buss), through which electricity (voltage) may be applied from outside to the transparent conductive layer, e.g., along the lengthwise direction of the transparent substrate in the production process of a roll-form EL device.

To increase the area of EL devices, it is a key factor how a terminal (buss), which supplies electricity (voltage) to a transparent conductive layer from the outside, is provided. For example, in the case of EL devices for displays with a small area, busses which are not electrically in contact with a rear electrode, can be formed on a transparent conductive layer by effectively repeating screen printing. However, none of the above cited publications or patents disclose the formation of busses continuously in the lengthwise direction of the device, or any methods for such formation.

U.S. Pat. No. 4,143,297 refers to electroluminescent information display panels which are said to be suitable for uses extending from simple numeric displays to color TV panels. The display panel comprises a body of insulating resin having a layer of electroluminescent particles embedded therein. This layer is a monoparticle layer. The resin has a dielectric constant higher than that of the particles and includes fluorescent material on at least one side of the layer of electroluminescent particles. Furthermore, insulating coatings on both front and back surfaces of the resin body, a transparent front electrode extending over the insulating coating of the front surface, a back electrode disposed on the insulating coating on the back surface and means for electrically energizing the electrons are provided. At least one element of the display panel adjacent the back thereof is black and sufficiently opaque to absorb substantially all the light reaching it.

WO 98/53645 refers to an electroluminescent device and a method for producing the same. Among others the electroluminescent device comprises a luminescent layer comprising a transparent support layer comprising a matrix resin, an insulating layer comprising an insulating material and a luminescent particle layer consisting essentially of particles which comprise luminescent particles and which are embodied in both the support layer and the insulating layer.

Conventional "lamination type luminescent layers" have several drawbacks. For example, EL devices having "lamination type luminescent layers" can emit light at a luminance equal to or higher than that of EL devices having "dispersion type luminescent layers" when they are connected with a power source having the same frequency and the same voltage. However, the luminescent efficiency is not improved so greatly, or sometimes it may deteriorate.

Luminescent efficiency ("η") is a value defined by the following formula:

$$\eta = L \times \pi \times S / P$$

where:

P is a used electricity (effective electric power) (unit: W),

L is a luminance measured with a luminance meter (unit: $cd/m^2$),

S is the area of a luminescent surface, and

π is the ratio of the circumference of a circle to its diameter.

In other words, a low luminescent efficiency means a low luminance per unit effective electric power, and thus a low power efficiency. Accordingly, it is a goal to improve the luminescent efficiency from the viewpoint of energy-saving.

SUMMARY

In one embodiment, the present invention provides an EL device having an effectively improved luminescent efficiency. Preferred such electroluminescent devices comprise:

a transparent conductive layer, a binder layer placed on the back surface of the transparent conductive layer, a luminescent-particle layer comprising a substantially single layer of particles containing luminescent particles, which layer is applied on the back surface of the transparent conductive layer through the binder layer, an insulating layer comprising insulating particles, which is placed on the back surface of the luminescent-particle layer, and a rear electrode placed on the back surface of the insulating layer, wherein the luminescent particles are embedded in the binder layer, or the luminescent particles are substantially not embedded in the insulating layer.

In another embodiment, the present invention provides a method for the production of an EL device, which method can produce a sheet-form EL device having a high luminescent efficiency at a high productivity without the use of the above dispersion coating.

Preferred methods for the production of an electroluminescent device (which optionally comprise the features described above) comprise the steps of:

applying a coating for the formation of a first layer of a binder layer on either one of the back surface of a transparent conductive layer and the surface of an insulating layer, placing particles containing luminescent particles in a layer form on the applied coating prior to the solidification of the coating, and solidifying the coating after partly embedding the layer of the particles, to form the first layer of a binder resin and the luminescent-particle layer adhered to the first layer, applying a coating for the formation of a second layer of a binder layer on the luminescent-particle layer, and solidifying the coating, to embed the luminescent particles in the binder layer consisting of the first and second layers without exposing the surfaces of the luminescent particles, and applying the other of the transparent conductive layer and the insulating layer on the binder layer in which the luminescent particles are embedded.

In yet another embodiment, the present invention provides an EL device which can be produced in a roll-form from which a large-size luminescent device can be easily produced.

In this embodiment, the present invention provides an electroluminescent device as described above, in which the transparent conductive layer, luminescent-particle layer, insulating layer and rear electrode preferably continuously extend along the length of the transparent conductive layer. The device further preferably comprises at least one buss which is electrically in contact with the back surface of the transparent conductive layer, has a width smaller than the width of the transparent conductive layer and continuously extends along the length of the transparent conductive layer, and the buss is not electrically in contact with the rear electrode.

One of the characteristics of the EL device according to one embodiment of the present invention is that luminescent particles are embedded in a binder layer. Thereby, the efficiency of luminance in relation to an effective electric power (luminescent efficiency) can be increased.

Although not intending to be bound by theory, the function of this structure of an EL device may be assumed as follows:

In conventional lamination type EL devices, spaces between phosphor (luminescent) particles are filled with fillers having a very high dielectric constant (e.g. insulating particles, etc.). Thus, a capacitance in the spaces between the phosphor particles increases. Accordingly, a dielectric loss in such spaces increases, and/or an electric power is lost due to the generation of Joule heat. Therefore, the luminescent efficiency decreases.

In general, the dielectric constant of insulating particles is at least 100, and typical insulating materials having a relatively high insulating effect such as barium titanate have a dielectric constant of 1,000 or larger. In contrast with such insulating particles, organic polymers or high dielectric polymers, which can be used as binder resins (sometimes called as "matrix resins"), usually have a dielectric constant of less than about 50, and preferable high dielectric polymers such as vinylidene fluoride resins and cyanoresins have a dielectric constant of from about 5 to about 30. Herein, a dielectric-constant is a specific dielectric constant measured under the application of an alternating current of 1 kHz, unless otherwise specified.

In the above construction of the present invention, luminescent particles are preferably embedded in a binder resin layer, and preferably few (or more preferably effectively no) insulating particles having a very high dielectric constant are present in spaces between adjacent luminescent particles. Thus, the capacitance in such spaces can be effectively decreased.

One of the characteristics of an EL device according to another embodiment of the present invention is that luminescent particles are substantially not embedded in an insulating layer. When a luminescent-particle layer is substantially not embedded in an insulating layer, fillers having a very high dielectric constant (e.g. insulating particles, etc.) do not fill the spaces between the phosphor (luminescent) particles, like in the above embodiment. Accordingly, it is possible to suppress the increase of a dielectric loss and the electric power loss due to the generation of Joule heat in such spaces as much as possible, and thus a luminescent efficiency can increase. Such a structure can be easily formed, for example, by embedding luminescent particles in a binder layer, like in the above case, so that the particle surfaces do not expose on the back surface of the binder layer which is in contact with the insulating layer.

Characteristics of an EL device in one preferred embodiment of the present invention are that a transparent conductive layer, a luminescent-particle layer, an insulating layer and a rear electrode continuously extend along the lengthwise direction of a transparent electrode layer, and that the device further comprises at least one buss which is electrically in contact with the back surface of the transparent conductive layer and has a width smaller than the width of the transparent conductive layer and continuously extends along the lengthwise direction of the transparent electrode layer. Another preferred characteristic is that the buss is not electrically in contact with the rear electrode. Thus, it is possible to produce a roll-form EL device, from which a large-sized luminescent display can be easily formed.

When a buss is not in direct contact with a luminescent layer, it becomes more easy to form a roll-form EL device having a large area, since a rear electrode can be applied onto substantially the whole back surface of the luminescent layer, and thus substantially the whole surface of the luminescent layer can emit light.

For example, a buss can be in direct contact with the edge area of a luminescent layer. However, in this case, the buss and an electrode-free area in which no rear electrode is applied should be provided on the back surface of the luminescent layer to separate the rear electrode and the buss, so that the buss and rear electrode are not electrically in contact with each other. A part of the light-emitting surface of the luminescent layer, which corresponds to the electrode-free area, can emit substantially no light, and thus the light-emitting area may not be increased.

The EL device of the present invention can be produced by various methods. For example, it is preferably produced by a method, which comprises the steps of:

applying a coating for the formation of the first layer of a binder layer on either one of the back surface of the transparent conductive layer and the surface of the insulating layer, placing particles containing luminescent particles in a layer form on the applied coating prior to the solidification of the coating, and solidifying the coating after partly embedding the layer of the particles, to form the first layer of a binder resin and the luminescent-particle layer adhered to the first layer, applying a coating for the formation of the second layer of a binder layer on the luminescent-particle layer, and solidifying the coating, to embed the luminescent particles in the binder layer consisting of the first and second layers without exposing the surfaces of the luminescent particles, and applying the other of the transparent conductive layer and the insulating layer on the binder layer in which the luminescent particles are embedded.

The above method can produce an EL device having an improved luminescent efficiency at a good productivity. Furthermore, a sheet-form EL device having a large area or a roll-form EL device can be easily produced.

WORKING EMBODIMENTS OF THE INVENTION

Figure 1:
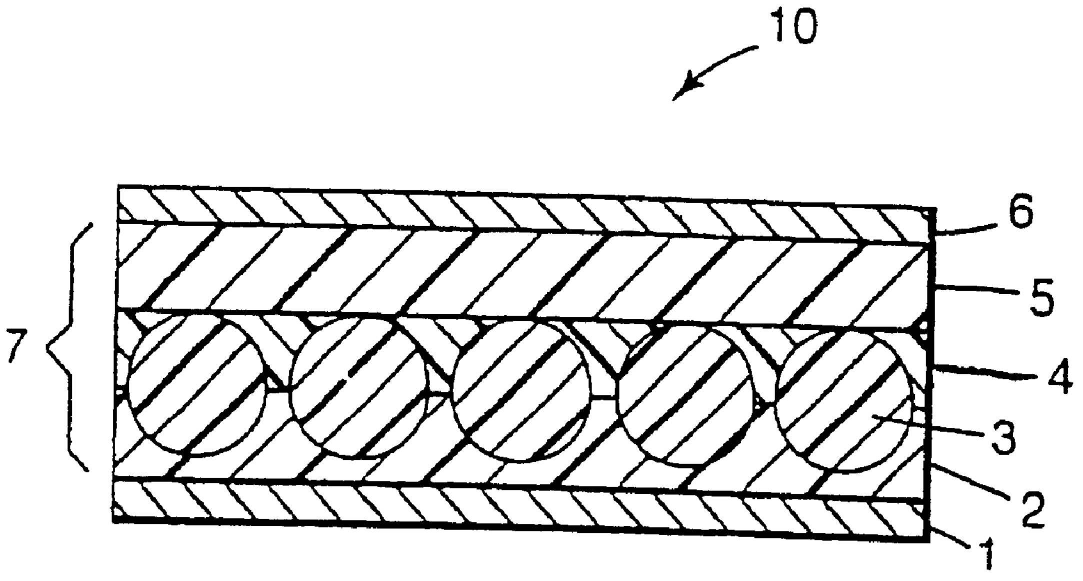
FIG. 1 is a cross-sectional view of an electroluminescent device.

An EL device 10 according to one embodiment of the present invention is shown in FIG. 1 and comprises a transparent conductive layer 1 in close contact with a transparent substrate (not shown), a rear electrodes 6, and a luminescent layer 7 which is placed between the transparent conductive layer and the rear electrode.

In one embodiment, the luminescent layer 7 comprises a first layer 2 of the binder layer, a luminescent-particle layer 3 comprising luminescent particles which are in close contact with the first layer of the binder layer so that they are partly embedded in the first layer, while remaining parts of the particles are exposed, a second layer 4 of the binder layer which is in close contact with the luminescent-particle layer to cover the exposed remaining parts of the luminescent particles, and an insulating layer 5 which is in close contact with the second layer 4 of the binder layer.

In the embodiment of FIG. 1, the rear electrode 6 and the insulating layer 5 are preferably in contact with each other, and their contact surfaces are preferably substantially flat.

In the embodiment of FIG. 1, the luminescent-particle layer 3 is preferably completely embedded in the binder layer comprising a binder resin and is not in contact with the insulating layer 5 containing insulating particles, or the luminescent particles are in point contact with the insulating layer, that is, most of the luminescent particles (those having relatively large particle sizes, etc.) are in point contact with the insulating layer, but, few and preferably no insulating particles are present in the spaces between the adjacent luminescent particles. The opposing surfaces of the insulating layer and transparent conductive layer are substantially parallel with each other and substantially flat. Such a structure is advantageous to increase a luminescent efficiency.

If desired, the transparent conductive layer and luminescent layer may be in contact with each other. In such a case, a luminance can be effectively increased. In general, an interface between the insulating layer and rear electrode is substantially flat.

The whole thickness of an EL device is usually in the range of 50 to 3000 μm, and the length of an EL device is usually at least 1 m, when it is in the roll form.

Preferably, the width of a transparent conductive layer is wider than that of a luminescent layer, and at least one buss is formed in the area of the transparent conductive layer in which no luminescent layer is formed, though not shown in the figure. In this case, the buss is not in direct contact with the luminescent layer, or not in electrically contact with the rear electrode. In such a structure, busses are usually applied near the lengthwise edges of the transparent conductive layer in the form of two stripes, which are substantially in parallel with the luminescent layer carrying the rear electrode.

The shape and arrangement of a buss are not limited to those described above, insofar as the buss functions as a terminal for supplying an electricity (voltage) to a transparent conductive layer from outside. For example, a buss may consist of a plurality of small buss parts which extend in the form of a bar code in the lengthwise direction, or a plurality of circular buss parts which are present along the length of the device. That is, small busses may discontinuously exist in the lengthwise direction, insofar as the busses as a whole continuously extend.

For example, when an EL device for a large-sized display is formed by cutting a desired length from the stock product of an EL device, a luminescent layer should be present on a transparent conductive layer with no discontinuous part, while adjacent buss parts may be discretely present insofar as the buss parts can function as terminals for supplying an electricity (voltage) to a transparent conductive layer from the outside.

A buss may be formed from a conductive material by an application method, which can be employed also in the formation of a rear electrode. The application method is preferably the application of a coating containing a conductive material, vapor deposition, sputtering, etc., since a buss, which continuously extends along the lengthwise direction of a transparent substrate, can be easily formed in the production method of a roll-form EL device.

As explained above, an EL device of one preferred embodiment of the present invention is characterized in that luminescent particles are embedded in a binder layer, and no insulating particles are present in spaces between adjacent luminescent particles. Accordingly, a luminescent efficiency can be increased. That is, the spaces between the phosphor particles are filled with a binder resin containing no insulating particles. In such a case, the luminescent-particle layer is substantially not embedded in the insulating layer.

The term "substantially not embedded in an insulating layer" means that (1) a luminescent-particle layer is not in contact with an insulating layer, (2) a luminescent-particle layer is in point contact with an insulating layer, or (3) a luminescent-particle layer is in contact with an insulating layer while no insulating particles are present in the spaces between the adjacent luminescent particles. In the cases (1) and (2), the opposing surfaces of the insulating layer and transparent conductive layer are substantially in parallel with each other, and substantially flat.

Furthermore, luminescent particles having a relatively wide particle size distribution may be used, so that a part of the luminescent particles are embedded in an insulating layer insofar as the effects of the present invention are not impaired.

A particle size distribution can be defined as follows:

The percentage of particles having a particle size of not exceeding 5 times the average particle size is usually at least 85% preferably at least 90%, and more preferably at least 95%, based on the whole particles. The percentage of particles having a particle size of a half or less of the average particle size is usually at least 1%, preferably at least 2%, in particular from 3% to 25%, based on the whole particles.

Particle sizes can be measured with a scanning electron microphotograph (SEM photograph). In the case of non-spherical particles, the particle size of each particle is the average of the largest size of the particle (e.g. the major axis of an ellipsoid) and the smallest size of the particle (e.g. the minor axis of an ellipsoid) observed in a SEM photograph.

As explained in the above, the dielectric coefficient of insulating particles is usually at least 100, while that of binder resins is usually less than 50. In the above structure, luminescent particles are embedded in a binder layer, but they are substantially not embedded in an insulating layer. Thus, a capacitance in the above spaces can be effectively decreased.

To effectively decrease the capacitance in the above spaces, a binder layer may optionally be separated in two layers, a luminescent-particle layer in the form of a single layer is formed so that a part of the luminescent-particle layer is embedded in the first layer of the binder layer, and the second layer of the binder layer is applied to cover the exposed part of the luminescent-particle layer, whereby the luminescent-particle layer is embedded in the binder layer consisting of the first and second layers, without exposing the surfaces of the luminescent particles. In this case, the first and second layers contain substantially no insulating particles.

Suitable polymers which can be used as binder resins include THV (tetrafluoroethylene-hexafluoropropylene-vinylidene fluoride copolymers), etc.

When a binder layer has two or more layers, a binder resin in a layer facing an insulating layer preferably has an as small dielectric constant as possible and/or an as small dielectric tangent as possible. For example, the dielectric constant of a binder resin in a layer on an insulating layer side is usually 20 or less, preferably 15 or less, in particular from 1 to 10.

A dielectric constant may be decreased by the addition of glass bubbles (glass balloons or hollow particles) to the layer of a binder layer on the insulating layer side to fill minute bubbles. In this case, the diameter of a bubble is preferably smaller than the particle size of luminescent particles, and is usually 10 μm or less.

A luminescent-particle layer in the form of a substantially single layer may be formed from a coating (slurry) containing a binder resin such as a high dielectric polymer, and luminescent particles dispersed in such a binder resin. In this case, for example, a curtain coating method is employed to reduce the thickness of the coating without the application of any shear on the coating, and to form a luminescent layer having substantially the same thickness as the particle size of the luminescent particles. The coating procedure which applies no shear on the coating can easily form a luminescent layer which is continuous in the lengthwise direction. The coating (coated film) can be solidified by any conventional method such as drying, cooling, curing, etc.

When a luminescent layer comprises a luminescent-particle layer, a binder layer and an insulating layer, a luminance can be increased in comparison with that of the conventional dispersion type EL devices. That is, the problems, which may be caused by the sink of the luminescent particles in a coating for forming a luminescent layer, are not caused, unlike the "dispersion type luminescent layers", since an insulating layer and a binder layer can be formed from coatings containing few or more preferably no luminescent particles. Therefore, the filling rate of luminescent particles in a luminescent-particle layer can be very easily increased, and can reach a substantially close-packed state, for example, at least 60%, and thus a luminance and luminescent efficiency can be easily improved. An EL device having such a luminescent-particle layer is preferable from the viewpoint of the production of a roll-form EL device having a large area. In addition, it is very easy to form a luminescent layer which continuously extends in the lengthwise direction. The luminescent-particle layer of a luminescent layer having such a structure can be formed by a powder-coating method, for example, scattering of luminescent particles, the details of which will be explained below.

An EL device having such a luminescent-particle layer is preferably produced by the following method.

Firstly, a coating for forming the first layer of a binder layer is applied on the back surface of a transparent conductive layer which has been formed on the back surface of a transparent substrate, and particles containing luminescent particles are scattered in the form of a layer on the coating prior to the solidification of the coating. After partly embedding the layer of particles in the coating, the coating is solidified to form the first layer of a binder layer, and a luminescent-particle layer which is partly embedded in the first layer.

Then, a coating for forming the second layer of the binder layer is applied on the above luminescent-particle layer, and solidified to embed the luminescent-particle layer in the binder layer consisting of the first and second layers without exposing the surfaces of the luminescent particles.

The coating of the first and second layers may be carried out by various methods, including, for example, roll coating, bar coating, knife coating, die coating or curtain coating. These coating methods can easily achieve the embedding of the luminescent-particle layer and the smoothening of the surface of the binder layer.

Subsequently, an insulating layer is applied on the binder layer (the back surface side) in which the luminescent-particle layer is embedded. The insulating layer is preferably formed by applying a coating for an insulating layer containing a resin and insulating particles dispersed in the resin on the back surface of the binder layer, and drying it.

Finally, a rear electrode is applied on the back surface of the insulating layer to finish the EL device of the present invention.

Alternatively, it may be possible to employ anther method in which the layers are formed in the reverse order. That is, firstly, the second layer of a binder layer, a luminescent-particle layer and the first layer of the binder layer are laminated on the smoothened surface of an insulating layer which has been formed on a rear electrode, and finally a transparent conductive layer (or a transparent substrate carrying a transparent conductive layer) is laminated.

The above methods can very easily produce an EL device having an improved luminescent efficiency continuously at a high rate, namely, at a high productivity. For example, an EL device can be produced at a coating rate of at least 5 mpm (m/min.), preferably from 10 to 200 mpm, in particular from 12 to 100 mpm.

The amount of luminescent particles in the particles contained in the luminescent-particle layer is preferably at least 40 volume %. When the amount of the luminescent particles is less than 40 volume %, the effects to improve the luminance and luminescent effect may deteriorate. The luminance and luminescent effect are maximized when the particles consist of luminescent particles. Thus, the particularly preferable amount of the luminescent particles contained in the phosphor particle layer is from 50 to 100 volume %.

An insulating layer may be placed at a certain distance (space) from a luminescent-particle layer and a binder layer, so that the luminescent particles are substantially not embedded in the insulating layer. In this case, the surfaces of the luminescent particles may be exposed on the binder layer. That is, the surfaces are exposed in an air layer (space) formed between the insulating layer and binder layer. Such a structure may be formed by providing spacer elements discretely on the back surface of the binder layer in which the luminescent particles are partly embedded, and bonding the insulating layer to the spacer elements. In this case, the surfaces of the luminescent particles are exposed in an air layer (air rooms) surrounded by the binder layer, spacer elements and insulating layer. In such a structure, the luminescent particles are substantially not embedded in the insulating layer.

As explained in the above, the preferred embodiment of the present invention provides an EL device which can be produced in a roll form. In a roll-form EL device, a transparent conductive layer, a luminescent layer (comprising a binder layer, a luminescent-particle layer which is bonded to the transparent conductive layer through the binder layer, and an insulating layer), a rear electrode and a buss are placed on a transparent substrate, which continuously extends in the lengthwise direction, and they continuously extend along the lengthwise direction of the transparent substrate. Thus, it is very easy to obtain an EL device having a luminescent layer with a large-area (plane size), etc., which continuously extend in the lengthwise direction. That is, a roll-form EL device having a luminescent layer extending in the lengthwise direction is produced and stored as a stock product. Then, an EL device having a desired length can be obtained by cutting such a length from the stock product of an EL device.

The conventional production methods using screen printing can form laminated parts such as a luminescent layer, a buss, etc. on a transparent substrate discontinuously in the lengthwise direction. A conventional stock product of EL devices which are produced by screen printing can provide only EL devices having a size (length) which does not include the above discontinuous part. In contrast, when the roll-form EL device of the present invention is used as a stock product, it can be applied to products having various sizes, as explained in the above.

A roll-form EL device is preferably produced by a method comprising the following steps:

providing a transparent substrate on one surface of which a transparent conductive layer is applied;

forming a luminescent layer by placing a binder layer a luminescent-particle layer and an insulating layer on the transparent conductive layer so that the width of the luminescent layer is smaller than that of the transparent conductive;

placing a masking on the exposed part of the transparent conductive layer of the luminescent layer-carrying substrate, that is, a luminescent layer-free area, in the lengthwise direction of the transparent substrate, where the masking has a width smaller than that of the luminescent layer-free area; and applying a conductive material onto the luminescent layer-carrying substrate to form a rear electrode and a buss which is electrically in contact with neither the luminescent layer nor the rear electrode due to the presence of the masking or an exposed part from which the masking is removed.

One of the characteristics of this method is that the rear electrode and buss preferably can be formed so that the buss is in direct contact with neither the luminescent layer nor the rear electrode due to the presence of (1) the masking or (2) the exposed part of the transparent conductive layer from which the masking has been removed, and on which no luminescent layer has been applied.

In this method, a masking may be removed if desired. It is not necessary to remove a masking insofar as a buss is not electrically in contact with a rear electrode. For example, a masking is not removed, when the first conductive material which forms a rear electrode and the second conductive material which forms a buss are applied at the same time but with different application apparatuses, or in different steps, and a masking prevents the rear electrode and the buss, which are formed from two conductive materials, from being in contact each other. Furthermore, a masking is not removed, when the thicknesses of a luminescent layer and a masking are sufficiently large in comparison with the thickness of a buss to be formed, and conductive materials, which are applied at the same time, can be separated between a buss-forming area and a rear electrode-forming area. However, a masking is preferably removed, since a rear electrode and a buss, which are not electrically in contact each other, can be easily formed.

The first and second conductive materials may be the same or different. However, a buss and a rear electrode are preferably formed at the same time, since the production steps can be simplified, and the productivity increases.

A roll-form EL device having high luminance and a large area can be produced at a high productivity, when the EL device is produced by a method comprising the following steps:

providing a transparent substrate on one surface of which a transparent conductive layer is applied;

placing a masking on the surface of the transparent conductive layer to cover a buss-forming area, on which a buss will be formed, with the masking, so that a buss-forming area having the applied masking and a masking-free area having no masking are formed on the transparent conductive layer;

placing a luminescent layer on the masking-free area of the transparent conductive layer to form a luminescent layer carrying substrate; and applying a conductive material onto the luminescent layer-carrying substrate to form the rear electrode on the luminescent layer, removing at least a part of the masking to expose the buss-forming area, and then applying a conductive material onto the exposed buss-forming area, to form the rear electrode and the buss which is electrically in contact with neither the luminescent layer nor the rear electrode due to the presence of the masking or the exposed part from which the masking is removed.

One of the characteristics of this method is that a masking is applied on a transparent conductive layer prior to the application of a luminescent layer to form a buss-forming area having the applied masking, and a masking-free area having no masking. This method can easily prevent the damage of the buss-forming area on the transparent conductive layer due to scratching, etc. from the step of the formation of a luminescent layer to the step of the formation of a buss. In this case, a masking makes it easy to form a continuous buss in the lengthwise direction of the substrate, and functions as a protective film of a transparent conductive layer (in the buss-forming area).

In this method, a masking is removed, and it may be removed partly or wholly. For example, in the applying step, the first conductive material is applied on a luminescent layer-carrying substrate, and at least a part of the masking is removed to expose a buss-forming area. Then, the second conductive material is applied on the exposed buss-forming area to form a buss. Alternatively, when a part of the masking is removed and then the second conductive material is applied to the exposed buss-forming area, the remaining masking may be removed if necessary. Preferably, the whole masking is removed, since a rear electrode and a buss, which are not electrically in contact each other, can be easily formed. The first and second conductive materials may be the same or different.

When a masking is utilized as the protective film of a transparent conductive layer, preferably a part of the masking is removed in the applying step to expose a buss-forming area, and then the conductive material is applied on the luminescent layer-carrying substrate to form, at the same time, a rear electrode and a buss which is electrically in contact with neither the luminescent layer nor the rear electrode, since the rear electrode and the buss, which are not electrically in contact with each other, can be particularly easily formed, and thus the production steps can be simplified.

The above buss is preferably formed by any application method of a conductive material (e.g. application of a coating liquid, vapor deposition, sputtering, etc.). Thereby, a buss, which extends continuously along the lengthwise direction of the substrate, can be particularly easily formed in the production process of a roll-form EL device. Conductive materials, which are used to form a buss and a rear electrode will be explained below.

As masking materials, repeelable adhesive tapes such as masking tapes, application tapes for sealing, etc., repeelable resin coatings, and the like, which are used in general coating methods, can be used.

The thickness of a masking is usually from 0.1 to 100 $\mu$m. The preferable thickness of a masking is from 0.1 to 30 $\mu$m, when a masking is used as-the protective film of a transparent conductive layer (in a buss-forming area).

Now, the component elements used in the present invention will be explained in detail.

A transparent substrate is preferably used as the support of a transparent conductive layer. The transparent substrate may be a glass plate, a plastic film, etc., which is used in the conventional dispersion type EL devices.

Examples of suitable plastic films used as substrates are films of polyester resins such as polyethylene terephthalate (PET), polyethylene naphthalate (PEN), etc.; acrylic resins such as polymethyl methacrylate, modified polymethyl methacrylate, etc.; fluororesins such as polyvinylidene fluoride, acryl-modified polyvinylidene fluoride, etc.; polycarbonate resins; vinyl chloride resins such as vinyl chloride copolymers; and the like.

The transparent substrate may be a single layer film, or it may be a multilayer film. For example, the whiteness of the light can increase, when at least one layer of the film or multilayer film has high transparency and contains a dye which develops a complimentary color to a color emitted by the luminescent layer. Preferably, examples of such a dye are red or pink phosphor dyes such as rhodamine 6G. rhodamine B, perylene dyes, etc. when the emitted light from the luminescent layer is blue-green. Furthermore, processed pigments comprising these dyes dispersed in resins may be used.

Preferably both surfaces of the transparent substrate are usually flat, while the surface which is not in contact with the transparent conductive layer may have prismic projections unless the effects of the present invention are impaired.

The light transmission through the transparent substrate is usually at least 60%, preferably at least 70%, in particular at least 80%. Herein, the "light transmission" means the transmission of light measured using a UV-light/visible light spectrophotometer "U best V-560" (manufactured by NIPPON BUNKO KABUSHKIKAISHA) with light of 550 nm.

The thickness of a transparent substrate is usually between 10 and 1000 $\mu$m when a roll-form EL device is formed.

A transparent substrate may contain additives such as UV light absorbers, moisture absorbents, colorants, phosphor materials, phosphors, and the like unless the effects of the present invention are impaired.

A transparent conductive layer preferably is placed on the back surface of the transparent substrate in close contact therewith. The transparent conductive layer may be any transparent electrode which is used in the dispersion type EL devices such as an ITO (Indium-Tin Oxide) film, and the like. The thickness of the transparent conductive layer is usually between 0.01 and 1000 $\mu$m, and the surface resistivity is usually 500 Ω/square or less, preferably between 1 and 300 Ω/square. The light transmission is usually at least 70%, preferably at least 80%.

Suitable ITO film is formed by any conventional film-forming method such as vapor deposition, sputtering, paste coating, and the like. The ITO film optionally is formed directly on the transparent substrate, while a primer layer may be formed on the transparent substrate, and then the ITO film may be formed on the primer layer. The thickness of a primer is usually between 0.1 and 100 $\mu$m. In place of the primer layer, the surface of the transparent substrate is treated with corona, and the like to facilitate the adhesion of the ITO film. Alternatively, the ITO film is formed on a luminescent layer and then a transparent substrate is laminated on the ITO film.

Alternatively, an ITO film, which has been formed on the release surface of a temporary substrate, is transferred to the back surface of a transparent substrate through a transparent adhesive. As a temporary substrate, a release paper, a release film, a low density polyethylene film, etc. can be used.

A rear electrode layer preferably is placed on the back surface of a luminescent layer, that is, the side facing an insulating layer. The rear electrode is in direct contact with the luminescent layer in the embodiment of FIG. 1.

A resin layer can be provided between the rear electrode and the luminescent layer to increase the adhesion between them. A resin for the resin layer may be the same resin as a binder resin, which will be explained below. The resin layer may contain insulating organic particles.

A rear electrode may be a conductive film used in the dispersion type EL devices such as a metal film of aluminum, gold, silver, copper, nickel, chromium. etc.; a transparent conductive film such as an ITO film; a conductive film such as a conductive carbon film; and the like. Such a conductive material film is preferably formed by the application of a coating containing a conductive material (e.g. bar coating, spray coating, curtain coating, etc.), vapor deposition, sputtering, and the like. The metal film may be a vapor deposited film, a sputtered film, a metal foil, and the like. Also, an electrode film comprising a substrate (e.g. a polymer film, etc.) carrying a conductive layer can be used as a rear film.

The thickness of the rear electrode is usually between 5 nm and 1 mm.

The EL device can emit light from both surfaces when the rear electrode consists of a transparent conductive film and also the insulating layer is transparent.

A binder layer is placed preferably on the back surface of a transparent conductive layer in close contact therewith, and thereby the luminescent efficiency of the luminescent layer is easily increased. The binder layer preferably is a transparent layer containing a binder resin. The thickness of each of the first and second layers of the binder layer is usually between 0.5 and 1000 $\mu$m, and the light transmission is usually at least 70%, preferably at least 80%. The total thickness of the binder layer (irrespective of a single layer or a multilayer having two or more layers) is usually from 1.0 to 2000 $\mu$m, and the light transmission is usually at least 70%, preferably at least 80%.

A binder resin may be a high dielectric polymer, a polymer having a relatively low dielectric constant (for example, less than 5), etc. The polymers having the high dielectric constant are those having a dielectric constant of usually at least about 5, preferably between 7 and 25, more preferably between 8 and 18. When the dielectric constant is too low, the luminance may not increase. When it is too high, the luminescent efficiency may not increase.

Examples of the polymers having the high dielectric constant are vinylidene fluoride resins (e.g. the above-described THV, etc.), cyanoresins, polyvinylidene chloride resins, and the like, and mixture of two or more of them. For example, the vinylidene fluoride resin may be obtained by copolymerization of vinylidene fluoride and at least one other fluorine-containing monomer. Examples of the other fluorine-containing monomer are tetrafluoroethylene, trifluorochloroethylene, hexafluoropropylene, and the like.

Examples of the cyanoresin are cyanoethylcellulose, cyanoethylated ethylene-vinyl alcohol copolymer, cyanoethylpullulan, cyanoetylated polyvinyl alcohol, and the like.

A binder layer usually consists of a binder resin, while it may contain additives such as other resins, fillers, bubbles, hollow or solid minute glass particles, surfactants, UV light absorbers, antioxidants, antifungus agents, rust-preventives, moisture absorbents, colorants, phosphors, and the like, unless the effects of the present invention are impaired. For example, the binder layer may contain red or pink phosphor dyes such as rhodamine 6G, rhodamine B, perylene dyes, and the like, when the emitted light from the luminescent-particle layer is blue-green. Furthermore, the above other resins may be curable or tacky.

In addition, a layer of a binder layer, which is provided on the insulating layer side, may contain bubbles or minute hollow glass particles to decrease the dielectric constant of the binder layer.

An insulating layer in a luminescent layer is essential to effectively prevent the dielectric breakdown of the luminescent layer. Insulating materials contained in the insulating layer may be the ones having a dielectric constant of 100 or larger, such as inorganic insulating particles, which are used in the conventional dispersion type EL devices.

The insulating layer is usually a coating layer formed from a coating which has been prepared by dispersing the insulating particles in a resin. The resin of the insulating layer is preferably a polymer having a high dielectric constant, which can be used in a binder layer.

Examples of the insulating particles are insulating inorganic particles of, for example, titanium dioxide, barium titanate, and the like.

The insulating layer may be formed by the application of a coating on either a rear electrode or a binder layer in which a luminescent-particle layer is embedded.

When the insulating layer is a coating layer comprising insulating particles and a polymer having a high dielectric constant, the amount of the insulating particles is between 1 and 400 wt. parts, preferably between 10 and 350 wt. parts, more preferably between 20 and 300 wt. parts, per 100 wt. parts of the polymer having the high dielectric constant. When the amount of the insulating particles is too low, the insulating effect decreases, and the dielectric breakdown may occur when a relatively high voltage is applied. When the amount is too high, the application of the coating may be difficult.

The thickness of the insulating layer is usually between 2 and 1000 $\mu$m. The insulating layer may contain additives such as fillers, surfactants, antioxidants, antifungus agents, rust-preventives, moisture absorbents, colorants, phosphors, curable resins, tackifiers, and the like, insofar as the insulating properties are not impaired.

Luminescent particles in a luminescent particle layer spontaneously emit light when they are placed in an alternating electric field. As such the particles, phosphor particles which are used in the luminescent layer of the dispersion type EL devices can be used. Examples of the phosphor materials are single substances of phosphor compounds (e.g. ZnS, CdZnS, ZnSSe, CdZnSe, etc.), or mixtures of the phosphor compounds and auxiliary components (e.g. Cu, I, Cl, Al, Mn, $NdF_3$, Ag, B, etc.). The average particle size of the phosphor particles is usually between 5 and 100 $\mu$m. Particulate phosphor materials, on which the coating film of glass, ceramics, and the like is formed, may be used.

The thickness of the luminescent particle layer is usually between 5 and 500 $\mu$m. When the phosphor particle layer consists of a plurality of particles which are placed in a single layer state, the EL device can be made thin easily.

Furthermore, the luminescent particle layer may contain at least two kinds of luminescent particles. For example, at least two kinds of luminescent particles which emit blue, blue-green, green or orange light and have discrete spectra each other are mixed, and thus a luminescent layer having the high whiteness can be formed.

The luminescent particle layer may contain one or more kinds of particles other than the luminescent particles, for example, particles of glass, coloring materials, phosphors, polymers, inorganic oxides, and the like. For example, luminescent particles which emit blue-green light and a pink-coloring material which is the complimentary color to blue-green (e.g. particles containing rhodamine 6G, rhodamine B, perylene dyes, etc.) are mixed for forming the luminescent layer having the high whiteness.

The laminate structure of a luminescent layer comprising a binder layer, a luminescent particle layer and an insulating layer may be formed as follows:

Firstly, a luminescent-particle layer is formed on the surface of a transparent conductive layer by any conventional powder coating method. For example, a binder layer is applied on the back surface of a transparent conductive layer, and then particles containing luminescent particles are scattered on the binder layer while it maintains flowability, by a suitable method such as static suction, spraying, gravimetric scattering, and the like, so as to completely embed the particles in the binder layer. After that, the flowability is deprived of from the binder layer, and the binder layer and particle layer are bonded.

When a binder layer consists of two layers, a luminescent particle layer is formed so that the particles are partly embedded in the first layer, and then the flowability is deprived of from the first layer, so that the binder layer and particle layers are bonded. Then, the exposed surfaces of the luminescent particles are completely covered with the second layer to form the luminescent-particle layer embedded in the binder layer.

For maintaining the flowability of the binder layer, the following methods are preferable: a method for maintaining the undried state of a coating layer formed from a coating for a binder layer containing a solvent, a method for maintaining a binder layer at a temperature higher than the softening or melting point of a resin for a binder layer, and a method for adding a radiation-curable monomer or oligomer to a coating for a binder layer. These methods make a solidifying procedure for suppressing the flowability of the binder layer (drying, cooling or hardening) easy.

An insulating layer is then laminated on the binder layer which has been formed as above, and a laminate structure in which they are bonded is formed. The insulating layer is preferably laminated by applying a coating containing materials for forming the insulating layer and solidifying it, or by press-bonding a film made of materials for forming the insulating layer. These methods can surely form a luminescent layer having a high durability, in which a binder layer, a luminescent-particle layer and an insulating layer are closely bonded.

In the luminescent-particle layer formed as above, the binder resin penetrate in spaces between the particles. In such a case, the filling rate of particles is usually at least 20 volume %, preferably at least 30 volume %, more preferably at least 40 volume % since the decrease of the filling rate may lead to the decrease of luminance and luminescent efficiency.

Herein, the "filling rate of particles" is defined as a percentage of the total volume of the particles in the volume of a hypothetical layer comprising all the particles in the luminescent particle layer and the materials which are present between the particles.

Furthermore, an insulating layer may be the laminate of two or more layers, unless the effects of the present invention are impaired.

Now, the production method of one preferable example of an EL device as a whole according to the present invention will be explained.

Firstly, a transparent substrate, on which back surface a transparent conductive layer has been laminated, is provided, and a binder layer containing an embedded luminescent-particle layer is applied to the back surface of the transparent conductive layer.

In general, the back surface of the transparent conductive layer is made substantially flat.

When a binder layer consists of two or more layers, the particles are embedded in one of the layers of the binder layer so that usually 1 to 99%, preferably 10 to 90%, more preferably 20 to 80% of the size of each particle in the vertical direction (to the plane of the support layer), for example, the diameter of a spherical particle, is embedded in the support layer. When the embedded percentage is less than 1%, the particle layer tends to be damaged during the formation of other layer of the binder layer. When the particles are embedded so that the embedded percentage exceeds 99%, the particle layer may not be uniformly formed in the form of a single layer.

The binder layer is formed so that it has a width smaller than that of a transparent conductive layer, when a buss is applied.

The coating thickness of the coating for forming the binder layer is selected so that the dry thickness of the binder layer is in the above range. The solid content in the coating for forming the binder layer is usually between 5 and 80 wt. % when the binder layer is a single layer or a multilayer. Suitable solvents used in the coating are selected from conventional organic solvents and mixtures of solvents, and preferably are selected so that the binder resin is effectively homogeneously dissolved.

The coating may be prepared with mixing or kneading apparatuses such as homomixers, sand mills, planetary mixers, and the like.

For applying the coating, coating apparatuses such as bar coaters, roll coaters, knife coaters, die coaters, and the like can be used.

The drying conditions depend on the kind of solvent in the coating and the solid content of the coating, and usually include a temperature in the range between room temperature (about 25° C.) and 150° C., and a drying time in the range between 5 seconds and 1 hour.

The particles including the luminescent particles are scattered by the above method within 3 minutes from the application of the coating for forming the binder layer, which makes the embedding of particles easy. The drying degree of the coating depends on the wettability between the particles and the binder layer, that is, the easiness to embed the scattered particles into the undried binder layer, and is usually in the range between 10 and 95 wt. %, preferably between 20 and 90 wt. % in terms of the solid content. When a coating having such a solid content is used, the back surface (on which an insulating layer is formed) of a binder layer having an embedded luminescent particles can be easily flattened. In this case, the back surface of the binder layer is substantially in parallel with the back surface of the transparent conductive layer.

After the formation of the binder layer in which the luminescent-particle layer is embedded as described above, a coating for forming an insulating layer is applied.

The coating thickness of a coating for forming an insulating layer is selected so that the dry thickness of the insulating layer is in the above range.

The solid content of the coating for forming the insulating layer is usually between 5 and 70 wt. %. When a coating having such a solid content is used, the surface (facing a transparent conductive layer) of an insulating layer can be easily flattened. A solvent used in the coating is selected from conventional organic solvents so that the insulating material is homogeneously dissolved or dispersed.

This coating may be prepared and applied using the same apparatuses or tools as those used for preparing and applying the coating for forming the binder layer.

The drying conditions depend on the kind of solvent in the coating and the solid content of the coating, and usually include a temperature in the range between room temperature (about 25° C.) and 150° C., and a drying time in the range between 5 seconds and 1 hour.

Finally, the rear electrode is laminated on the insulating layer.

A buss is formed on the luminescent layer-free area of the transparent conductive layer. In this case, a buss may be formed by a method using a masking as described above, so that the buss is electrically in contact with neither the luminescent layer nor the rear electrode.

The rear electrode may be formed by the above described methods. Among them, the methods for forming thin films in vacuum such as the vapor deposition and sputtering are preferable for effectively forming the rear electrode on the insulating layer, which has been dried, with good adhesion between the rear electrode and the insulating layer. The buss may be formed by the same methods as those employed in the formation of the rear electrode.

In general, the rear electrode is continuously formed over the whole back surface of a luminescent layer, that is, an insulating layer. However, the rear electrode may be formed partly on the luminescent layer in accordance with objects. For example, a rear electrode can be formed in an imagewise manner. Thereby, the EL device can emit light to display an image. To achieve the same purpose. the luminescent layer may be formed repeatedly in the lengthwise direction to display a continuous image.

The steps of the above described production method are substantially the same as those of a conventional method for producing a roll-form product. Therefore, roll-form EL devices having a large area, a high luminance and a high luminescent efficiency can be produced at a high productivity using the production steps for the conventional roll-form products. Furthermore, the problems caused by the use of dispersion coatings are solved, since the above method does not use the dispersion coatings of the luminescent particles.

The EL devices may be produced by an alternative method which may analogous to the above method, comprising applying a coating for an insulating layer on a support carrying a rear electrode, drying the applied coating to form an insulating layer, forming a binder layer in which luminescent particles are embedded, dry laminating a transparent substrate carrying a transparent conductive layer, and then, if necessary, laminating a buss on the luminescent layer-free area of the transparent conductive layer. This method is also preferable. In this case, the width of the rear electrode is smaller than that of the transparent conductive layer, and the buss is in direct contact with neither the rear electrode nor the luminescent layer.

The EL device of the present invention can be used as a light source for large-sized displays such as internal-illuminating billboards, road signs, decorative displays, and the like.

For example, images such as characters, designs, and the like are printed on the surface of a light-transmitting sheet, and the sheet is placed on the EL device with the back surface of the sheet facing the light-emitting side of the EL device.

The light-transmitting sheet may be made of the same material as that of the above transparent substrate, and preferably has a light transmission of at least 20%. In this case, the back surface of the sheet and the light-emitting side of the EL device are preferably bonded to each other. To this end, a light-transmitting adhesive is used. Examples of such an adhesive are pressure-sensitive acrylic adhesives, heat-sensitive acrylic adhesives, and the like.

Alternatively, an EL device built-in type display can be assembled by using a light-transmitting sheet as the above transparent substrate, forming the transparent conductive layer directly on the back surface of the light-transmitting sheet, and laminating the luminescent layer on the conductive layer.

Furthermore, a prism type retroreflective sheet may be used as a light-transmitting sheet (or a transparent substrate) . The combination with the retroreflective sheet can impart both the retroreflectivity and the self-light-emitting properties to the EL device built-in type display.

Light is emitted from the EL device by connecting the buss on the transparent conductive layer and the terminal on the rear electrode layer to a power source, and applying a voltage to the EL device.

As the power source, cells such as dry cells, batteries, solar cells, etc. may be used, or an alternating current is supplied to the EL device from a power line through an inverter, which alters the voltage or frequency, or change the current between the alternating current and the direct current. The frequency was from about 50 to 1000 Hz. The applied voltage is usually between about 3 and 200 V.

Preferred EL devices of the present invention have a high light-emitting efficiency, and therefore emit light with sufficient luminance (for example, 50 cd/m$^2$ or higher, more preferably 70 cd/m$^2$ or higher) at a lower voltage (for example, 100 V or lower) than that necessary for the conventional dispersion type ones. Preferred EL devices have a luminescent efficiency greater than 4 lm/W, more preferably greater than 4.3 lm/W, and most preferably greater than 6 lm/W.

When the EL device is used outdoors, it is preferably covered with water-capturing films made of, for example, polyamide resins, or moisture-proof films made of, for example, polytetrafluoroethylene.

Any component layer of the EL device of the present invention, which is present in a light path from the luminescent particles, for example, a transparent substrate and a binder layer may contain a colorant such as a dye or a pigment to adjust emitted light color. Furthermore, it is possible to provide, in a light path from the luminescent particles, a wavelength-conversion layer comprising a phosphor dye, a phosphor pigment, etc., which is excited with light from the luminescent particles and emits light having a wavelength different from that of the light from the luminescent layer. A component layer containing such a phosphor dye or a phosphor pigment, which is present in a light path from the luminescent particles, can be used as a wavelength-conversion layer.

EXAMPLES

Example 1

Production of EL Device

A roll-form laminated EL device including a luminescent layer having the structure of FIG. 1 was produced in this Example.

An ITO/PET laminate film of 320 mm in width and 60 m in length (trade name: TCF-KPC 300-75A manufactured by OIKE Industries, Ltd.) (thickness, 75 μm; light transmission, 81%) was used as a roll-form transparent substrate. This film had the transparent conductive layer of ITO (indium-tin-oxide) which had been laminated by sputtering on one surface of the film. The ITO layer had a thickness of 50 nm and a surface resistivity of 250 Ω/square.

The ITO surface of the above transparent substrate was coated with a coating for the first layer of a binder layer using a bar coater at a coating weight of 5 $g/m^2$ to form a continuous layer along the lengthwise direction of the substrate. The coating was the 15 wt. % solution of a polymer having a high dielectric constant as a binder resin (a tetrafluoroethylene-hexafluoropropylenevinylidene fluoride copolymer produced by 3M; trade name "THV 200 P" having a dielectric constant of 10 (at 1 kHz) and a light transmission of 96%) dissolved in the mixture of ethyl acetate and methyl isobutyl ketone (1:1).

Just after the application of the coating, phosphor particles (615A manufactured by Durel; having an average particle size of 15 to 25 μm; the percentage of particles having particle sizes in the range between 5 and 35 μm based on the whole particles=about 100%; the percentage of particles having particle sizes in the range between 5 and 10 μm based on the whole particles=about 3%; the particle sizes being measured with a SEM (the number n of particles=125)) were scattered with a spray coater (K-III Spray manufactured by NIKKA), and the solution layer was dried at 65° C. for about 1 minute, and then at 125° C. for about 3 minutes. Thus, a laminate was formed, in which the layer of phosphor particles in the form of a substantially single particle layer (luminescent-particle layer) was bonded to the back surface of the transparent conductive layer through the binder layer. The phosphor particles were embedded so that about 30% of the diameter of each particle was buried in the binder layer. The scattered amount of the phosphor particles was about 65 $g/m^2$, and the thickness of the luminescent-particle layer was 33 μm. Furthermore, the solution was coated so that an exposed part (non-coated part) of about 30 mm in width remained on each side of the ITO surface.

Next, a coating for the second layer of the binder layer was coated and dried in the same way as in the formation of the first layer. This coating was the same as the coating for the first layer of the binder. Subsequently, a coating for an insulating layer was applied on the back surface of the second layer of the binder layer, and dried to form an insulating layer.

The composition of the coating for an insulating layer contained the above THV 200P, barium titanate, ethyl acetate and methyl isobutyl ketone in a weight ratio of 11:26:31:31. The coating was applied with a bar coater so that a coating weight after drying was 27 $g/m^2$, and dried under the same conditions as those in the case of the binder layer. The barium titanate was HPBT-1 (trade name) of FUJI TITANIUM Co., Ltd. The total thickness of the luminescent layer was 40 μm after drying.

In the obtained luminescent layer, the luminescent-particle layer was completely embedded in the binder layer, but it was substantially not embedded in the insulating layer. Furthermore, the opposing surfaces of the insulating layer and transparent conductive layer were substantially in parallel with each other, and substantially flat.

Thus, a luminescent layer-carrying transparent substrate, which had the luminescent layer continuously extending in the lengthwise direction, was obtained.

Then, an application tape for sealing (trade name: 2479H manufactured by 3M; a width of 18 mm) as a masking was adhered to each edge portion on the ITO film side of the luminescent layer-carrying transparent substrate along the length of the substrate, with leaving an exposed surface having a width of about 5 mm on each side.

Finally, aluminum was vacuum deposited on the coated surface of the luminescent layer-carrying transparent substrate, that is, the surface having the luminescent layer, masking, and exposed ITO surfaces, and then the masking was removed. Thus, a rear electrode and two busses on both edge portions, which were all made of aluminum, were formed at the same time. Accordingly, the roll-form EL device of this Example was obtained.

The vacuum deposition of aluminum was carried out under a chamber pressure of $3.0\times10^{-4}$ to $5.0\times10^{-4}$ Torr at a line speed of 90 m/min.

Non-deposited parts remained between the rear electrode and two bases, and the busses were electrically in contact with neither the luminescent layer nor the rear electrode. The busses were stripe-form busses, which continuously extended in the lengthwise direction and had no discontinuous parts.

The cross section of the EL device of this Example was observed with a scanning electron microscope for checking. The spaces between the adjacent phosphor particles were filled with the binder resin, but no insulating particle was observed in the spaces.

Light Emission from EL Device

A rectangular EL device was cut out from the obtained roll-form EL device (stock product). Then, an alternating voltage of 100 V and 400 Hz was applied between the rear electrode and busses to illuminate the EL device. The EL device uniformly emit light over the entire luminescent surface. The luminescent surface of the rectangular EL device had plane sizes of 100 mm (length) and 100 mm (width).

To emit light from the EL device, a power supply (trade name: PCR 500L manufactured by KIKUSUI Electronic Industries, Ltd.) was connected between the ITO surface and the rear electrode, and a sine wave of 100 V and 400 Hz was applied.

An effective electric power P (W) and a luminance L ($cd/m^2$) during light emitting were measured with a power meter (trade name: WT-100E manufactured by YOKOGAWA ELECTRIC CORPORATION) and a luminance meter (trade name: BM-8 manufactured by TOPKON CORPORATION), respectively, in a dark room. Then, a luminance and a luminescent efficiency η (lm/W) were calculated according to the above mentioned formula. As the result, the effective electric power was 0.61 W, the luminance was 83 $cd/m^2$, and the luminescent efficiency was 4.3 lm (lumen)/W.

Comparative Example 1

An EL device of this Comparative Example was produced in the same manner as in Example 1 except that the formation of the second layer of the binder layer was omitted, and the coating for the insulating layer was applied instead of the coating for the second layer.

The cross section of this EL device was observed with a scanning electron microscope. The spaces between the phosphor particles were filled with the binder resin and also the insulating particles.

The effective electric power, luminance and luminescent efficiency of this EL device, which were measured in the same manners as in Example 1, were 1.3 W, 103 $cd/m^2$, and 2.5 lm/W, respectively.

The luminescent efficiency was about 40% lower than that of the EL device of Example 1.

Example 2

An EL device of this Example was produced in the same manner as in Example 1 except that a high dielectric polymer in the binder layer and insulating layer was changed to a cyanoresin (trade name: CR-M manufactured by Shin-Etsu Polymer Co., Ltd.; dielectric constant=18).

The cross section of this EL device was observed with a scanning electron microscope for checking. The spaces between the phosphor particles were filled with the binder resin, but no insulating particle was observed in the spaces.

The effective electric power, luminance and luminescent efficiency of this EL device, which were measured in the same manners as in Example 1, were 0.36 W, 75 cd/$m^2$, and 6.5 lm/W, respectively.

Comparative Example 2

An EL device of this Comparative Example was produced in the same manner as in Example 1 except that a "dispersion type" luminescent layer was used as a luminescent layer. This dispersion type luminescent layer was formed using a coating containing 45 wt. parts of phosphor particles in 100 wt. parts of the solution for forming the above binder layer.

The effective electric power, luminance and luminescent efficiency of this EL device, which were measured in the same manners as in Example 1, were 1.7 W, 65 cd/$m^2$, and 1.2 lm/W, respectively. The luminescent efficiency was about 70% lower than that of the EL device of Example 1.

Comparative Example 3

An EL device of this Comparative Example was produced in the same manner as in Comparative Example 1 except that a high dielectric polymer in the binder layer and insulating layer was changed to a cyanoresin (trade name: CR-M) which was used in Example 2.

The cross section of this EL device was observed with a scanning electron microscope. The spaces between the phosphor particles were filled with the binder resin and also the insulating particles.

The effective electric power, luminance and luminescent efficiency of this EL device, which were measured in the same manners as in Example 1, were 0.74 W, 95 cd/$m^2$, and 4.0 lm/W, respectively. The luminescent efficiency was about 40% lower than that of the EL device of Example 2.

Effects of the Invention

The present invention can provide a lamination type EL device having an increased luminescent efficiency. Furthermore, according to the present invention, a sheet-form EL device having a large area, a high luminance and a high luminescent efficiency can be produced at a high productivity using no dispersion coating for forming a luminescent layer. The production method of the present invention can mass-produce sheet-form EL devices having a large area from, for example, the roll-form stock of a transparent substrate having a width of 25 to 200 cm and a length of 100 to 20,000 m by successively laminating a transparent conductive layer, a binder layer, a luminescent-particle layer, an insulating layer and a rear electrode.

What is claimed is:

1. An electroluminescent device comprising:

a transparent conductive layer;

a binder layer placed on the back surface of the transparent conductive layer;

a luminescent-particle layer comprising a substantially single layer of particles containing luminescent particles, which layer is applied on the back surface of the transparent conductive layer through the binder layer;

an insulating layer comprising insulating particles, which is placed on the back surface of the luminescent-particle layer; and a rear electrode placed on the back surface of the insulating layer, wherein the luminescent particles are embedded in the binder layer;

wherein the width of the transparent conductive layer is wider than that of the luminescent layer.

2. An electroluminescent device as described in claim 1, wherein few or no insulating particles having a high dielectric constant are present in spaces between adjacent luminescent particles.

3. An electroluminescent device as described in claim 1, wherein the dielectric constant of the insulating particles is at least 100.

4. An electroluminescent device as described in claim 1, wherein the dielectric constant of the insulating particles is at least 1,000.

5. An electroluminescent device as described in claim 1, wherein the binder layer comprises a polymeric binder resin and the dielectric constant of the binder resin is less than 50.

6. An electroluminescent device as described in claim 5, wherein the binder resin comprises a polymer selected from the group consisting of vinylidene fluoride resins, vinylidene chloride resins, cyanoresins, and mixtures thereof.

7. An electroluminescent device as described in claim 1, wherein the rear electrode and the insulating layer are in contact with each other and their contact surfaces are substantially flat.

8. An electroluminescent device as described in claim 1, wherein the transparent conductive layer and the luminescent-particle layer are in contact with each other.

9. An electroluminescent device as described in claim 1, wherein the luminescent-particle layer is substantially not embedded in the insulating layer.

10. An electroluminescent device as described in claim 1, wherein the binder layer comprises at least two layers.

11. An electroluminescent device as described in claim 1, wherein the luminescent-particle layer comprises at least 40 volume % luminescent particles.

12. An electroluminescent device as described in claim 1, wherein the luminescent particles comprise phosphor compounds.

13. An electroluminescent device as described in claim 1, wherein the device further comprises a transparent substrate.

14. An electroluminescent device as described in claim 1, wherein the transparent conductive layer has a surface resistivity of 500 Ω/square or less.

15. An electroluminescent device as described in claim 1, wherein the rear electrode comprises a metal film.

16. An electroluminescent device as described in claim 1, wherein the device has a luminescent efficiency greater than 4 lm/W.

17. An electroluminescent device as described in claim 1, wherein the device has a luminescent efficiency greater than 4.3 lm/W.

18. An electroluminescent device as described in claim 1, wherein the device has a luminescent efficiency greater than 6 lm/W.

19. An electroluminescent device comprising:

a transparent conductive layer;

a binder layer placed on the back surface of the transparent conductive layer;

a luminescent-particle layer comprising a substantially single layer of particles containing luminescent particles, which layer is applied on the back surface of the transparent conductive layer through the binder layer;

an insulating layer comprising insulating particles, which is placed on the back surface of the luminescent-particle layer; and a rear electrode placed on the back surface of the insulating layer, wherein the luminescent particles are embedded in the binder layer;

wherein the binder layer comprises glass bubbles.

20. An electroluminescent device comprising:

a transparent conductive layer;

a binder layer placed on the back surface of the transparent conductive layer;

a luminescent-particle layer comprising a substantially single layer of particles containing luminescent particles, which layer is applied on the back surface of the transparent conductive layer through the binder layer;

an insulating layer comprising insulating particles, which is placed on the back surface of the luminescent-particle layer; and a rear electrode placed on the back surface of the insulating layer, wherein the luminescent particles are embedded in the binder layer;

wherein the device further comprises a transparent substrate and the substrate includes a dye which develops a complimentary color to a color emitted by the luminescent layer.

21. An electroluminescent device comprising:

a transparent conductive layer;

a binder layer placed on the back surface of the transparent conductive layer;

a luminescent-particle layer comprising a substantially single layer of particles containing luminescent particles, which layer is applied on the back surface of the transparent conductive layer through the binder layer;

an insulating layer comprising insulating particles, which is placed on the back surface of the luminescent-particle layer; and a rear electrode placed on the back surface of the insulating layer, wherein the luminescent particles are embedded in the binder layer;

wherein the device is in the form of a roll having a length of at least 1 m.

22. An electroluminescent device comprising:

a transparent conductive layer;

a binder layer placed on the back surface of the transparent conductive layer;

a luminescent-particle layer comprising a substantially single layer of particles containing luminescent particles, which layer is applied on the back surface of the transparent conductive layer through the binder layer;

an insulating layer comprising insulating particles, which is placed on the back surface of the luminescent-particle layer; and a rear electrode placed on the back surface of the insulating layer, wherein the luminescent particles are embedded in the binder layer;

wherein the transparent conductive layer, the luminescent-particle layer, the insulating layer and the rear electrode continuously extend along the length of the transparent conductive layer, the device further comprises at least one buss which is electrically in contact with the back surface of the transparent conductive layer, has a width smaller than the width of the transparent conductive layer and continuously extends along the length of the transparent conductive layer, and the buss is not electrically in contact with the rear electrode.

23. An electroluminescent device comprising:

a transparent conductive layer;

a binder layer placed on the back surface of the transparent conductive layer;

a luminescent-particle layer comprising a substantially single layer of particles containing luminescent particles, which layer is applied on the back surface of the transparent conductive layer through the binder layer;

an insulating layer comprising insulating particles, which is placed on the back surface of the luminescent-particle layer; and a rear electrode placed on the back surface of the insulating layer, wherein the luminescent particles are substantially not embedded in the insulating layer;

wherein the transparent conductive layer, the luminescent-particle layer, the insulating layer and the rear electrode continuously extend along the length of the transparent conductive layer, the device further comprises at least one buss which is electrically in contact with the back surface of the transparent conductive layer, has a width smaller than the width of the transparent conductive layer and continuously extends along the length of the transparent conductive layer, and the buss is not electrically in contact with the rear electrode.

* * * * *

UNITED STATES PATENT AND TRADEMARK OFFICE

CERTIFICATE OF CORRECTION

PATENT NO. : 6,613,455 B2
DATED : September 2, 2003
INVENTOR(S) : Matsumoto, Kazumi It is certified that error appears in the above-identified patent and that said Letters Patent is hereby corrected as shown below:

Column 2,
Line 25, delete the entire paragraph starting on line 25.
Line 42, delete the entire paragraph starting on line 42.

Column 3,
Line 16, start a new paragraph starting with "a luminescent-particle".

Column 4,
Line 27, delete "as" following "called".

Column 5,
Line 46, "DRAWINGS" should read -- DRAWING --.
Line 55, "electrodes" should read -- electrode --.

Column 10,
Line 17, insert -- layer -- following "conductive".
Lines 46 and 53, insert -- with -- following "contact".

Column 11,
Line 40, insert -- with -- following "contact".

Column 12,
Line 1, "as-the" should read -- as the --.
Line 20, "complimentary" should read -- complementary --.
Line 29, "prismic" should read -- prismatic --.

Column 13,
Line 62, "cyanoetylated" should read -- cyanoethylated --.

Column 14,
Line 66, "each other are mixed" should read -- mixed with each other --.

Column 15,
Line 6, "complimentary" should read -- complementary --.
Line 52, "penetrate" should read -- penetrates --.

Column 16,
Line 54, delete "an" before "embedded"

UNITED STATES PATENT AND TRADEMARK OFFICE

CERTIFICATE OF CORRECTION

PATENT NO. : 6,613,455 B2 
DATED : September 2, 2003
INVENTOR(S) : Matsumoto, Kazumi It is certified that error appears in the above-identified patent and that said Letters Patent is hereby corrected as shown below:

Column 17,
Line 45, insert -- be -- following "may".

Column 20,
Line 17, "bases" should read -- busses --.
Line 33, "emit" should read -- emits --.
Line 44, "100E" should read -- 110E --.

Column 23,
Lines 38 and 39, "complimentary" should read -- complementary --.

Signed and Sealed this

Third Day of February, 2004

JON W. DUDAS
*Acting Director of the United States Patent and Trademark Office*